United States Patent
Wong et al.

(10) Patent No.: US 7,187,557 B2
(45) Date of Patent: Mar. 6, 2007

(54) FUEL CELL POWER PACK

(75) Inventors: Hong W. Wong, Portland, OR (US); Daryl J. Nelson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 11/025,573

(22) Filed: Dec. 29, 2004

(65) Prior Publication Data

US 2006/0139899 A1 Jun. 29, 2006

(51) Int. Cl.
*H05K 7/00* (2006.01)

(52) U.S. Cl. .................... 361/760; 429/25; 429/34

(58) Field of Classification Search ............... 429/34, 429/35, 96, 22, 25; 361/736, 703, 704, 760
See application file for complete search history.

(56) References Cited

U.S. PATENT DOCUMENTS

| | | | |
|---|---|---|---|
| 6,955,863 B2 * | 10/2005 | Bean et al. | 429/96 |
| 7,005,206 B2 * | 2/2006 | Lawrence et al. | 429/34 |
| 2003/0157389 A1 * | 8/2003 | Kornmayer | 429/34 |
| 2004/0061474 A1 | 4/2004 | Ozeki | 361/760 |
| 2005/0118468 A1 * | 6/2005 | Adams et al. | 429/22 |
| 2006/0120001 A1 * | 6/2006 | Weber et al. | 361/103 |

FOREIGN PATENT DOCUMENTS

| WO | WO 01/71465 | 9/2001 |
|---|---|---|
| WO | WO 02/061861 A | 8/2002 |

OTHER PUBLICATIONS

PCT Search Report, PCT/US2005/046784, mailed Jul. 28, 2006.

* cited by examiner

*Primary Examiner*—Tuyet Vo
*Assistant Examiner*—Jimmy Vu
(74) *Attorney, Agent, or Firm*—Blakely, Sokoloff, Taylor & Zafman LLP

(57) ABSTRACT

According to one embodiment, a computer system is disclosed. The computer system includes a baseboard, a device bay including a fuel cell mounted on the baseboard, and a power pack coupled to the baseboard. The power pack includes a fuel cartridge that delivers fuel to the fuel cell.

21 Claims, 7 Drawing Sheets form, rather than in detail, in order to avoid obscuring the present invention.

FUEL CELL POWER PACK

FIELD OF THE INVENTION

The present invention relates to computer systems; more particularly, the present invention relates to dissipating heat generated while providing power to a computer system.

BACKGROUND

Mobile computer systems, such as notebook computers, typically include one or more power packs to provide power to the system whenever a permanent power source is not available. Currently, the power packs are realized using battery power.

It is anticipated that in the near future that fuel cell power packs will be capable of being substituted for traditional battery packs. Fuel cells provide a direct current as a byproduct of receiving chemicals (such as hydrogen and oxygen). Notwithstanding the implementation of fuel cells for a notebook computer power source, it is likely that, as for battery packs, each computer system vendor will provide a specific design for packs used for its particular system. Thus, it is unlikely that a power pack manufactured by one vendor may be implemented in the system of another.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A universal fuel cell power pack is described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
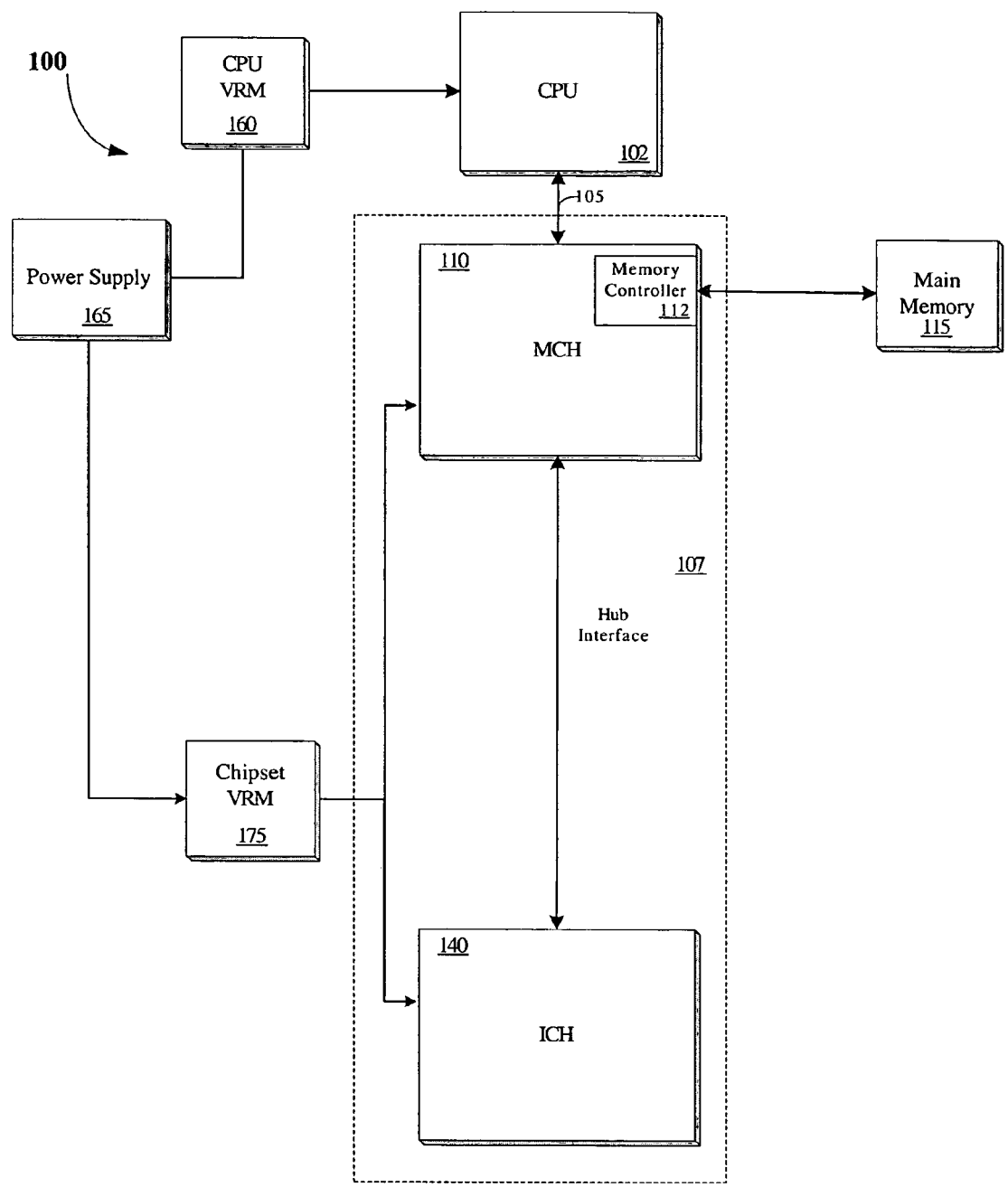
FIG. 1 is a block diagram of one embodiment of a computer system.

FIG. 1 is a block diagram of one embodiment of a computer system 100. According to one embodiment, computer system is a mobile computer system (e.g., a laptop, or notebook computer). Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 is coupled to an input/output control hub (ICH) 140 via a hub interface. ICH 140 provides an interface to input/output (I/O) devices within computer system 100. In addition, computer system 100 includes a power supply 165 and a multitude of voltage regulators that are used to provide power to various components within computer system 100. CPU voltage regulator module (VRM) 160 provides voltage to CPU 102. VRM 175 supplies voltage for both MCH 110 and ICH 140 within chipset 107.

Figure 2:
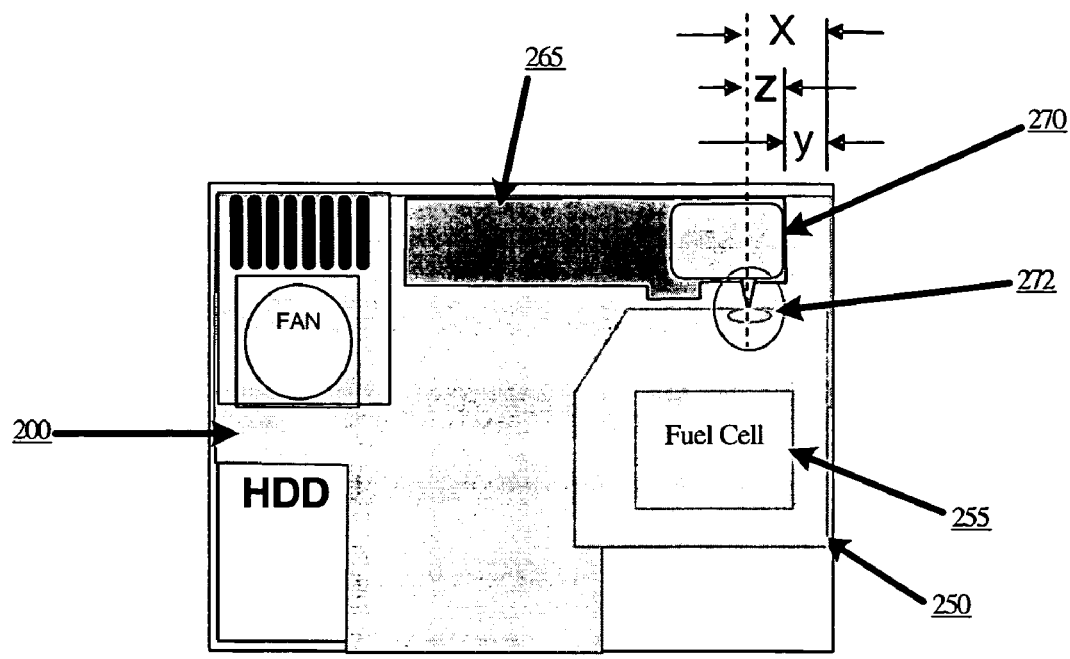
FIG. 2 illustrates a top view of one embodiment of a computer system baseboard.

FIG. 2 illustrates a top view of one embodiment of computer system 100 in a baseboard 200 layout for a mobile computer system. Baseboard 200 is a motherboard, or other printed circuit board (PCB) that includes the basic circuitry and integrated circuit (IC) components of computer system 100 mounted thereon. According to one embodiment, baseboard 200 includes a device bay 250 and a power pack 265.

Device bay 250 is an area on baseboard 200 that may be implemented to install an external I/O device, such as an optical drive. However, in one embodiment, device bay 250 is used to house a fuel cell 255. As discussed above, fuel cells provide power as a result of receiving chemicals. Therefore, fuel cell 255 represents the power supply 165 that provides power to the components of baseboard 200.

According to one embodiment, waste heat from the chemical reaction within fuel cell 255 is conducted out of device bay 250 via heat pipes, or other conductive materials to areas within the chassis that can take advantage of the chassis cooling system, or alternatively, to the exterior of the chassis from the insertion side of the fuel cell 255, to extended surfaces outside of the chassis. In the latter case, the extended hot surfaces may be shielded from the user, but exposed to the cool exterior air for natural convection and radiation cooling.

In a further embodiment, power pack 265 is used to store a fuel cartridge 270, which feeds chemical materials to fuel cell 255 via a nozzle 272. In yet a further embodiment, power pack 265 takes the shape of a typical battery pack that may be inserted into any type of notebook computer system, regardless of configuration. As shown in FIG. 2, power pack 265 is located at the rear and center of baseboard 200.

Figure 3:
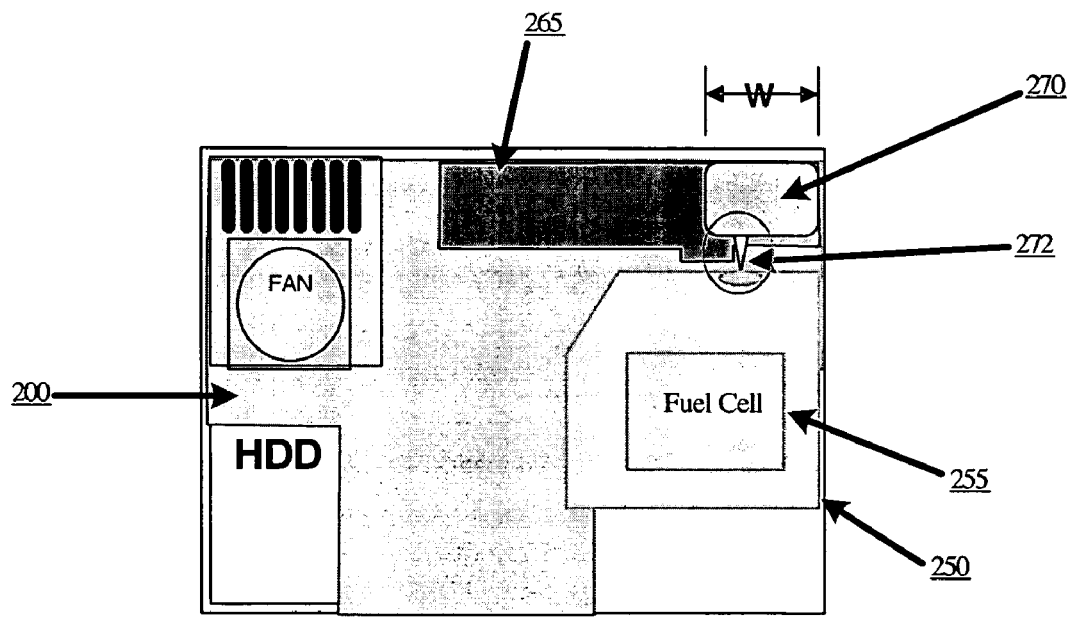
FIG. 3 illustrates a top view of another embodiment of a computer system baseboard.

FIG. 3 illustrates another embodiment of baseboard 200. In this embodiment, power pack 265 continues to be located at the rear of baseboard 200. However, power pack 265 is shifted to the far right of baseboard 200. In order for cartridge 270 to continue feeding fuel to fuel cell 255, cartridge 270 is flipped along the x-axis so that nozzle 272 is on the left side of cartridge 270.

Figure 4:
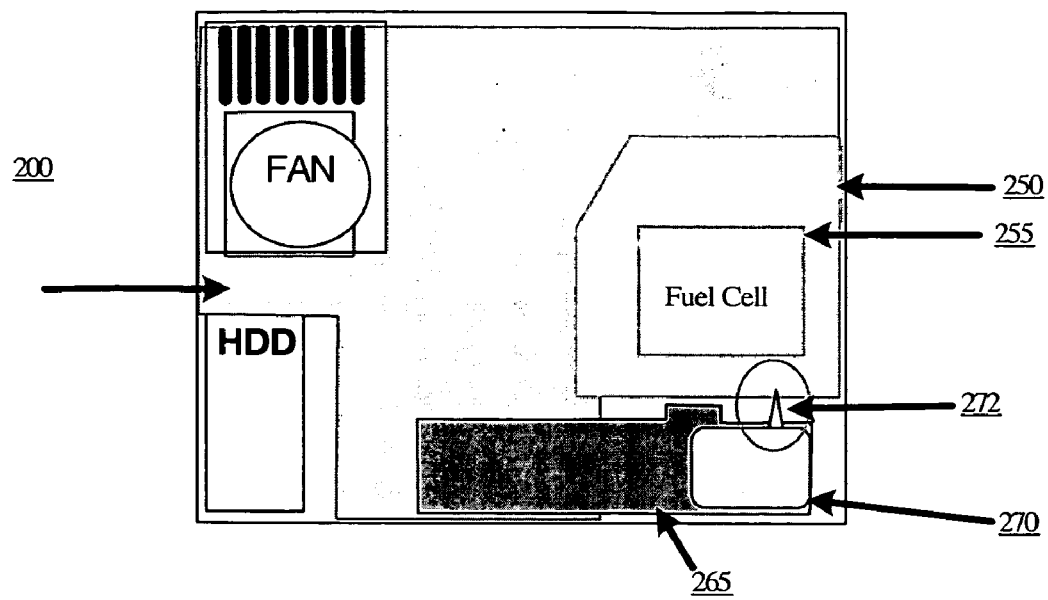
FIG. 4 illustrates a top view of yet another embodiment of a computer system baseboard.

FIG. 4 illustrates yet another embodiment of baseboard 200. In this embodiment, power pack 265 is located at the front and center of baseboard 200. In this instance, cartridge 270 is flipped along the y-axis so that nozzle 272 can feed fuel from below device bay 250.

Figure 5:
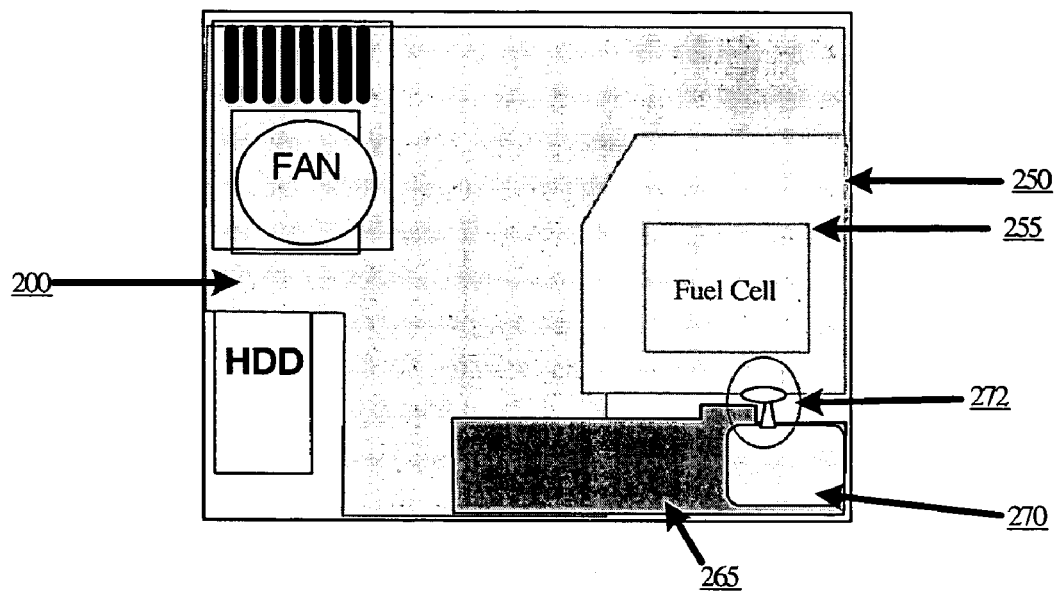
FIG. 5 illustrates a top view of still another embodiment of a computer system baseboard.

FIG. 5 illustrates still another embodiment of baseboard 200. In this embodiment, power pack 265 is located at the front of baseboard 200, and to the far right side. Further, cartridge 270 is flipped along both the x-axis and the y-axis so that nozzle 272 can feed fuel cell 255.

Figure 6:
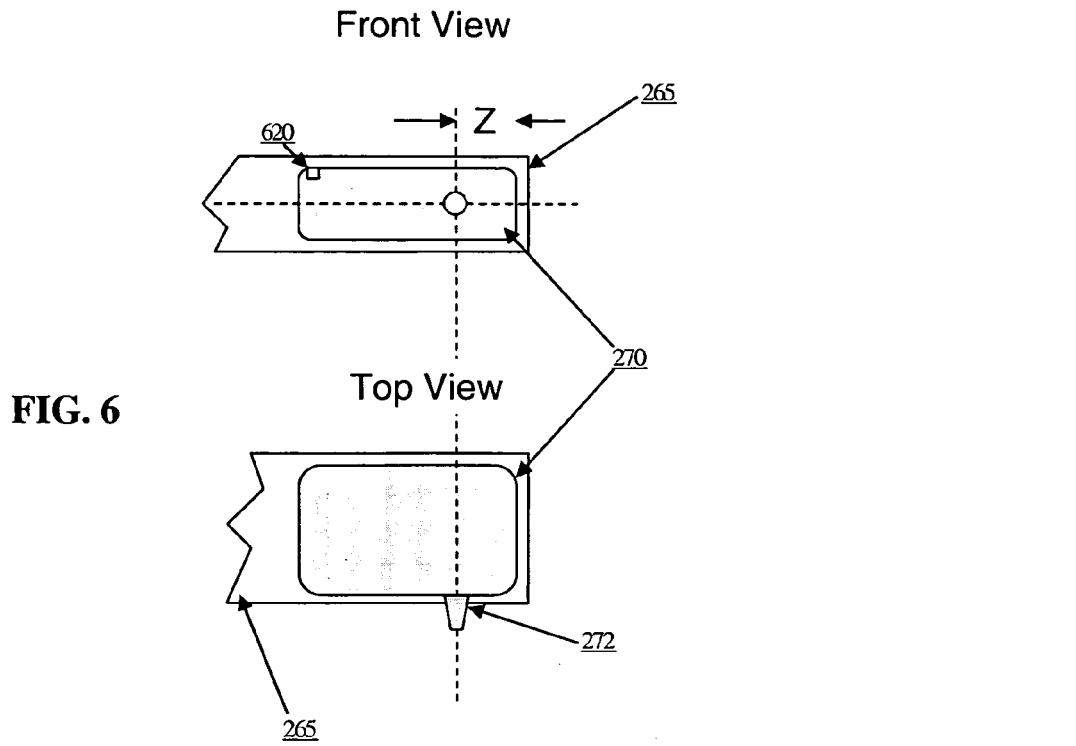
FIG. 6 illustrates top and front views of one embodiment of a fuel cartridge.

FIG. 6 illustrates top and front views of one embodiment of fuel cartridge 270. As shown in FIG. 6, nozzle 272 location is placed along the center line of fuel cartridge 270 and the pack 265 housing so that when rotated for use in the embodiments of FIGS. 3 and 4, nozzle 272 will still be aligned with the receptacle on fuel cell 255.

This arrangement also allows cartridge 270 to be used when the pack 265 is placed in the front portion of computer system 100 computer. A keying slot 620 is provided on cartridge 270 to maintain location on pack 265. In one embodiment, a carrier (not shown) is configured for either of the embodiments of FIGS. 3 and 4 to enable a user to correctly plug in cartridge 270 for different notebook designs.

According to one embodiment, the relationship of the W, X, Y, Z dimensions are based on:

$$Z=W/2-Y/2;\ X=Z+Y;$$

Where, W=Width of fuel cartridge 270, Y=gap between the computer housing to the right edge of power pack 265; and Z=center of nozzle 272 away from the edge of the cartridge 272. Table 1 illustrates exemplary dimensions if W=10 cm.

TABLE 1

| Y | X | Z |
|---|---|---|
| 1 cm | 5.5 cm | 4.5 cm |
| 2 cm | 6 cm | 4 cm |
| 3 cm | 6.5 cm | 3.5 cm |

Figure 7:
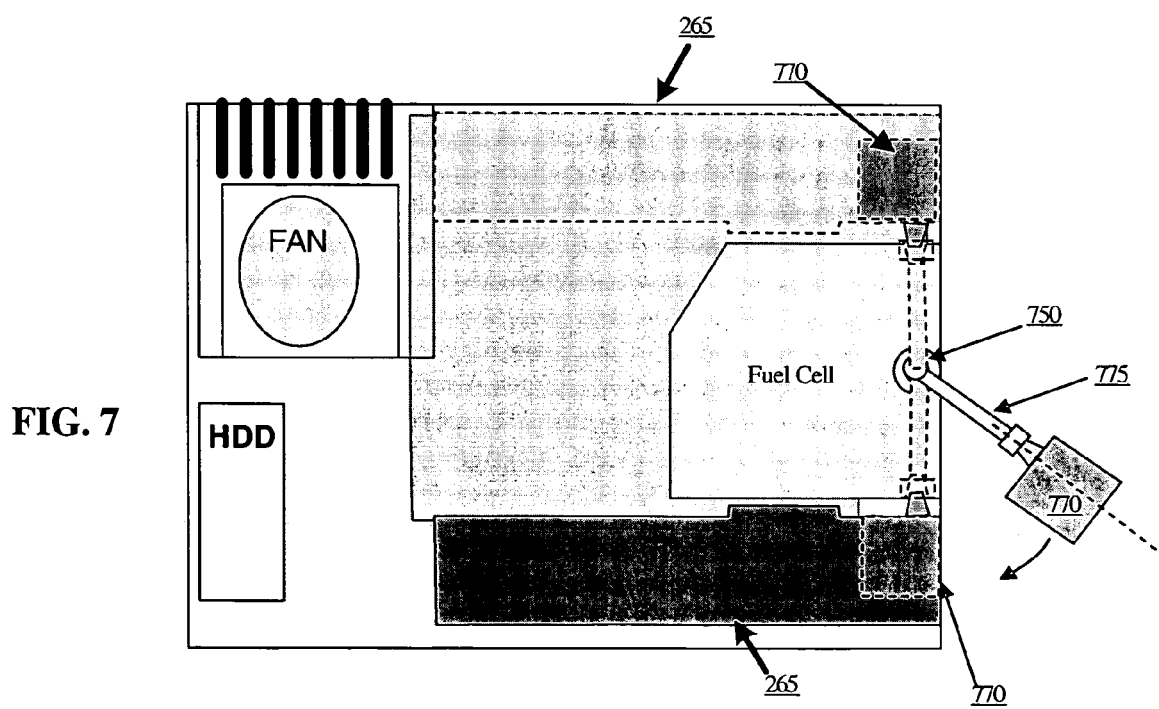
FIG. 7 illustrates a top view of further embodiment of a computer system baseboard.

FIG. 7 illustrates a further embodiment of a baseboard 200. In this embodiment, a fuel cartridge 770 is coupled to fuel cell 255 via a coupler 775. Further, a rotation joint 750 is located at device bay 250 to enable coupler 775 to rotate. Thus cartridge 770 may be moved to be stowed away depending upon the location of power pack 265. For example, if power pack 265 is mounted to the rear of baseboard 200, cartridge 770 is rotated via joint 750 and stored at the rear. Similarly, if power pack 265 is mounted to the front of baseboard 200, cartridge 770 is rotated via joint 750 and stored at the front. According to one embodiment, coupler 775 also enables cartridge 770 to be installed to the left or right of the center line of coupler 775 so that cartridge 770 may be stowed in pack 265

Figure 8:
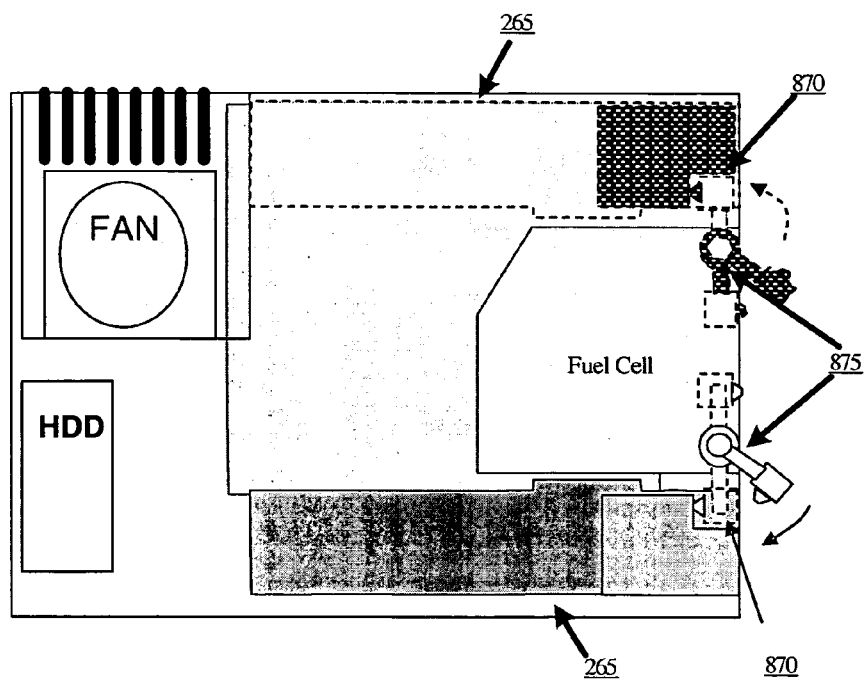
FIG. 8 illustrates a top view of another embodiment of a computer system baseboard.

FIG. 8 illustrates still a further embodiment of a baseboard 200. In this embodiment, a cartridge 870 is stowed in power pack 265. Further, two couplers 875 are included to couple the cartridge 870 to fuel cell 255. A rear coupler 875 couples cartridge 870 for embodiments where pack 265 is placed at the rear of baseboard 200. A front coupler 875 couples cartridge 870 for embodiments where pack 265 is placed at the front of baseboard 200. If either of the couplers 875 is not in use, it is stored in device bay 250.

Figure 9:
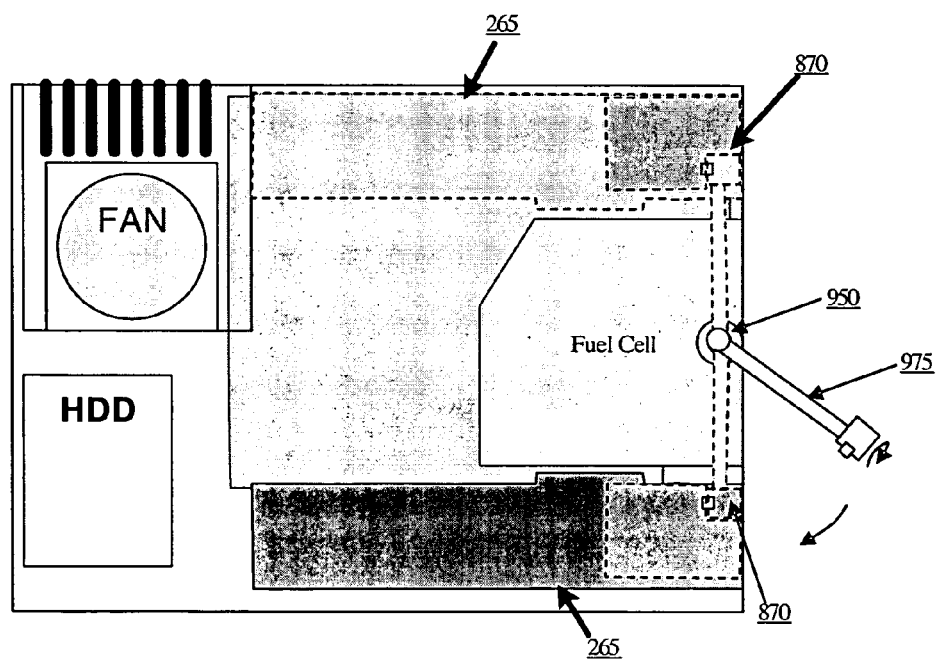
FIG. 9 illustrates a top view of yet another embodiment of a computer system baseboard.

FIG. 9 illustrates yet another embodiment of a baseboard 200. In this embodiment, cartridge 870 remains stowed in power pack 265. However, a coupler 975 is rotated to couple the cartridge 870 to fuel cell 255 depending upon location. For embodiments where pack 265 is placed at the rear of baseboard 200, coupler 975 rotates to the rear to couple cartridge 870 stowed in pack 265. For embodiments where pack 265 is placed at the front of baseboard 200, coupler 975 rotates to the front to couple cartridge 870 stowed in pack 265.

An issue with using fuel cells to provide power for a computer system is that it takes a period of time for a fuel cell to begin providing power. Conversely, another issue is that once the fuel cell begins to provide the power, it continues to supply the maximum magnitude of power regardless of the load needed by the computer system components.

Figure 10:
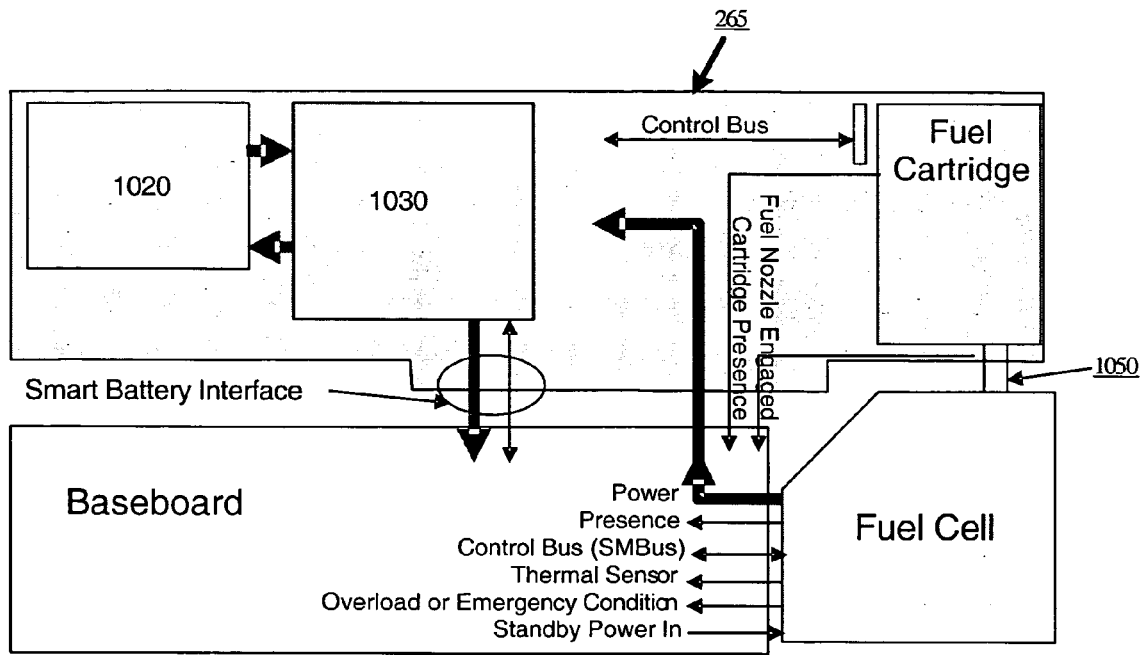
FIG. 10 illustrates a top view of one embodiment of a power control system.

FIG. 10 illustrates a top view of one embodiment of a power control system for providing power to computer system 100 regardless of load. The system includes power pack 265, a baseboard and fuel cell 255 at device bay 250. In this embodiment, a supplemental power supply 1020 and controller 1030 are include within power pack 265, in addition to a fuel cartridge.

According to one embodiment, fuel cell 255 provides for baseline power requirements (e.g., 10 watts) for computer system 100. Supplemental power supply 1020 provides additional power needs for computer system 100 in excess of the power provided by the fuel cell. In one embodiment, power supply 1020 includes battery cells. However in other embodiments, power supply 1020 may be a super capacitor.

Controller 1030 monitors the demands of devices on the baseboard and supplies power accordingly. For example, if the power requirements are approximately 10 watts, controller provides power via fuel cell 255. However, if the power requirements call for a worst case power scenario, e.g., 15 watts, controller provides power from fuel cell 255 and power supply 1020.

In one embodiment, signals are transmitted between fuel cell 255, the baseboard and/or battery pack 265. Such signals include Cartridge Presence, Fuel Nozzle Engaged, Presence, Control bus (SMBUS), Thermal sensor, and Overload or Emergency Condition.

Figure 11:
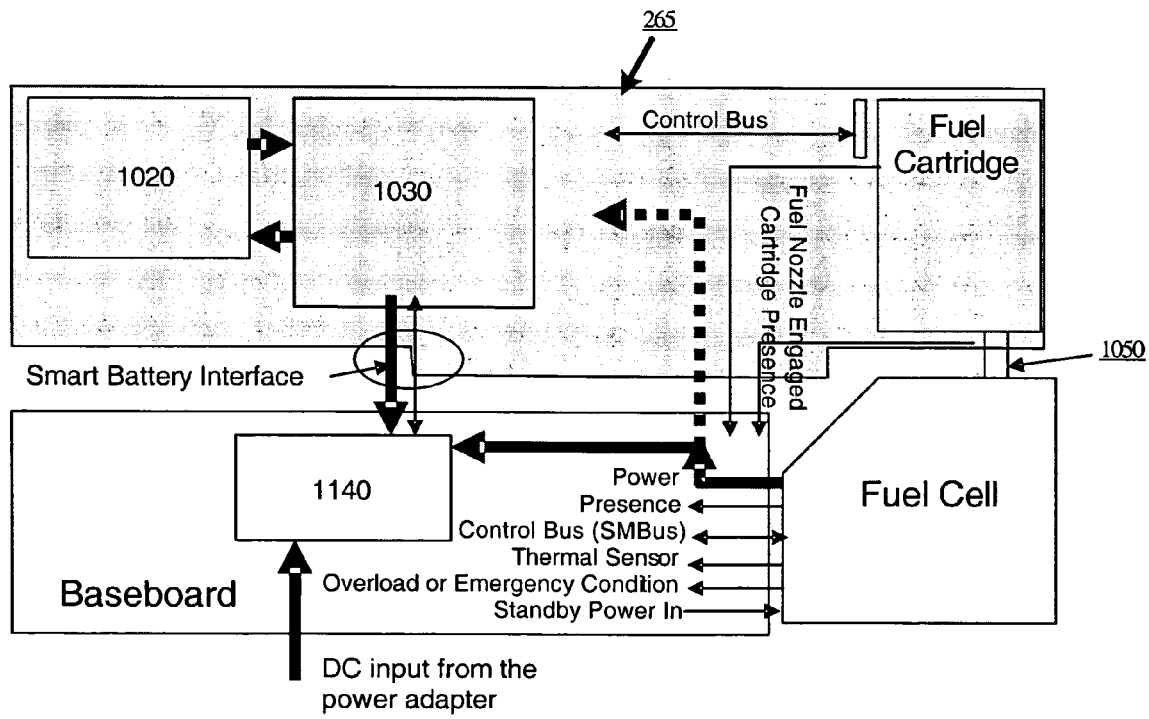
FIG. 11 illustrates a top view of another embodiment of a power control system.

FIG. 11 illustrates another embodiment of a power control system for providing power to computer system 100. In this embodiment, a power subsystem controller 1140 is included. In one embodiment, controller 1140 includes charging circuitry that receives DC power from a power adapter.

Figure 12:
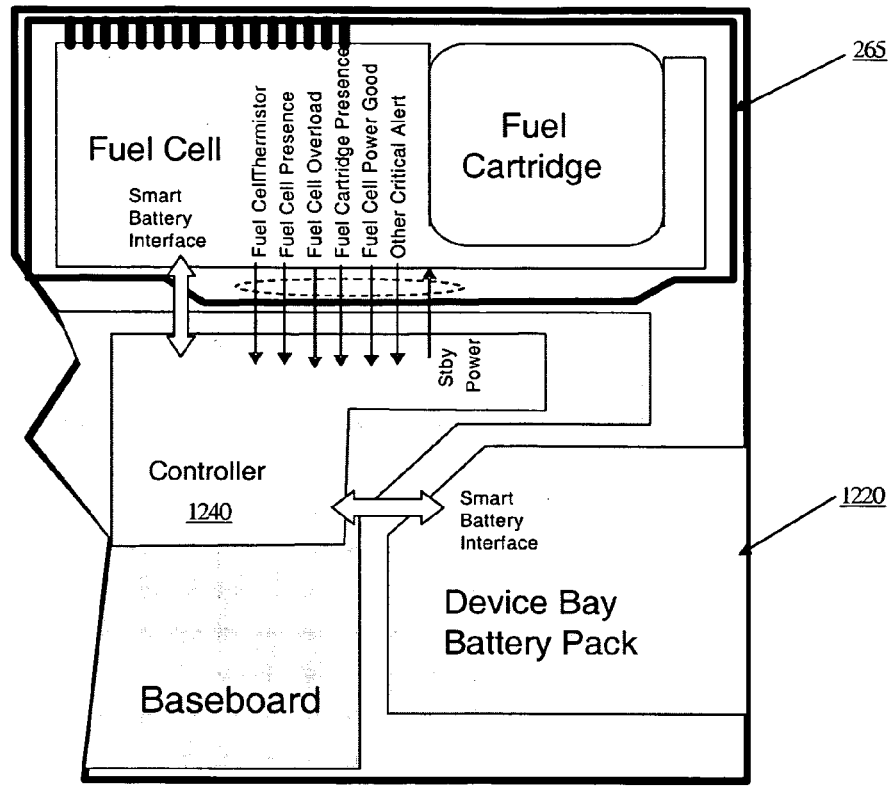
FIG. 12 illustrates a top view of further embodiment of a computer system baseboard.

FIG. 12 illustrates a top view of further embodiment of a computer system baseboard. In this embodiment, both the fuel cell and cartridge are installed in power pack 265. As a result, the device bay may include a supplemental battery pack 1220 to provide supplemental power similar to the embodiments disclosed above with reference to FIGS. 10 and 11.

In addition, the baseboard includes a controller 1240 that manages system input power, charger output power to battery pack 1220 among other functions. In one embodiment, there are a set of signals to support the design. These signals include Fuel Cell Thermistor, which is fail safe indicator for the fuel cell, Standby Power for keeping the controller 1240 powered in a system sleep mode. Also the fuel cell may require power to start the operation in embodiments where battery pack 1220 is not included.

Other signals include Cartridge presence, which allows the system to detect if there is a cartridge attached to the fuel cell, Fuel Cell presence to detect if there is a fuel cell in the package or if that is a battery only module, Overload, which is an urgent signal that may be used to drive system interrupt, Critical Alert—for events such as fuel leakage. In addition a Power Good signal is included from the fuel cell.

It should be noted that a few of the above signals, such as the Thermistor signal, are to be connected to the controller on the base board for safety purposes. The status of these signals can also be read from registers in the SMBus register space (not shown). The control signal "Fuel Cell On-Off" can be controlled via the SMBus also.

Figure 13:
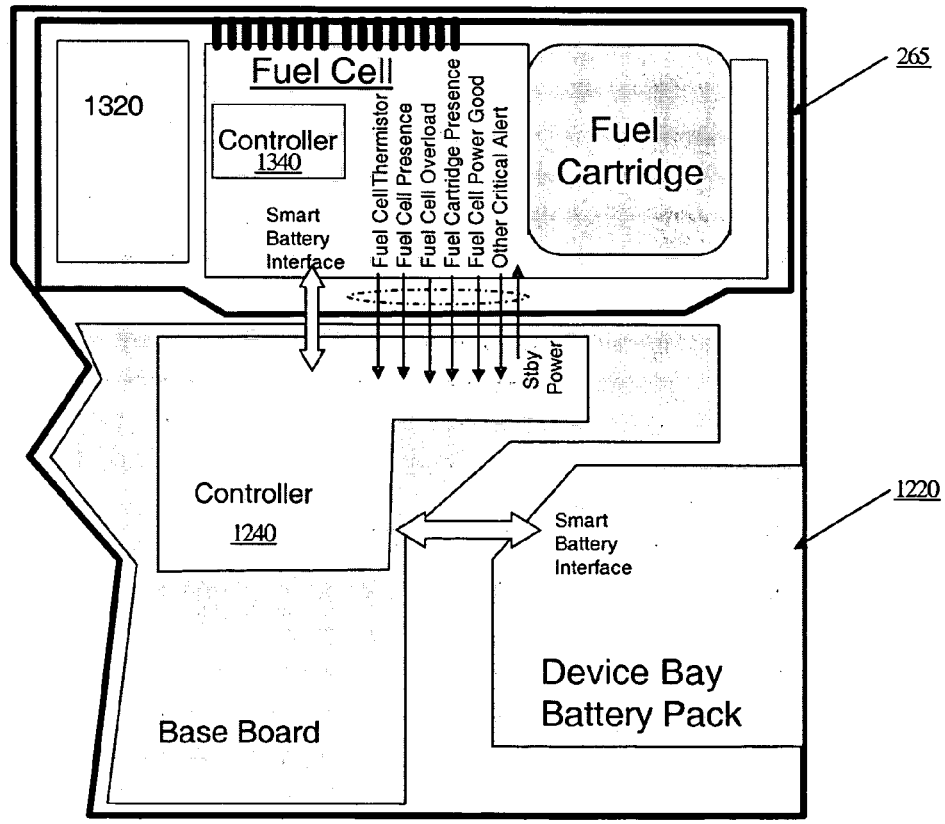
FIG. 13 illustrates a top view of another embodiment of a computer system baseboard.

FIG. 13 illustrates a top view of further embodiment of a computer system baseboard. In this embodiment, power pack 265 includes a supplemental power supply 1320 that may be included to provide additional power needs for computer system 100 in excess of the power provided by the fuel cell.

In addition, pack 265 includes a controller 1340 that monitors the demands of devices on the baseboard and supplies power as described above with respect to FIGS. 10 and 11. Note that in some embodiments, battery pack 1220 in the device bay may not be included.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computer system comprising:
   a baseboard;
   a device bay, mounted on the baseboard, having a fuel cell;
   a power pack, coupled to the baseboard, having a fuel cartridge to deliver fuel to the fuel cell;
   a rotation joint mounted on the device bay; and
   a coupler, coupled to the rotation joint and the fuel cartridge, to deliver fuel to the fuel cell.

2. The computer system of claim 1 wherein the fuel cartridge comprises a nozzle.

3. The computer system of claim 2 wherein the fuel cartridge further comprises a keying slot to enable the fuel cartridge to maintain location on the power pack.

4. The computer system of claim 3 wherein the fuel cartridge maintains alignment with the fuel cell whether the power pack is located at the front of the baseboard or the rear of the baseboard.

5. The computer system of claim 1 wherein the coupler rotates to deliver fuel from the fuel cartridge to the fuel cell whether the power pack is located at the front of the baseboard or the rear of the baseboard.

6. A computer system comprising:
   a baseboard;
   a device bay, mounted on the baseboard, having a fuel cell;
   a power pack, coupled to the baseboard, having a fuel cartridge to deliver fuel to the fuel cell;
   a first coupler, coupled to the device bay, to deliver fuel to the fuel cell if the fuel cell is mounted within a power pack located at the rear of the baseboard; and
   a second coupler, coupled to the device bay, to deliver fuel to the fuel cell if the fuel cell is mounted within a power pack located at the front of the baseboard.

7. The computer system of claim 6 wherein the power pack further comprises a supplemental power supply to provide supplemental power to the computer system.

8. The computer system of claim 7 wherein the supplemental power supply is a super capacitor.

9. The computer system of claim 7 wherein the supplemental power supply is a battery.

10. The computer system of claim 7 wherein the power pack further comprises a controller to monitor power demand within the computer system and to activate the supplemental power supply whenever the power demand exceed power generated by the fuel cell.

11. The computer system of claim 10 further a power subsystem controller mounted on the baseboard.

12. The computer system of claim 1 wherein the baseboard is a printed circuit board.

13. A computer system comprising:
   a baseboard;
   a device bay, mounted on the baseboard, having a supplemental battery pack;
   a power pack, coupled to the baseboard, having:
     a fuel cell; and
     a fuel cartridge to deliver fuel to the fuel cell;
   a rotation joint mounted on the device bay; and
   a coupler, coupled to the rotation joint and the fuel cartridge, to deliver fuel to the fuel cell.

14. The computer system of claim 13 further comprising a controller mounted on the baseboard and coupled to the fuel cell and the supplemental battery pack.

15. The computer system of claim 13 wherein the power pack further comprises a supplemental power supply to provide supplemental power to the computer system.

16. The computer system of claim 15 wherein the power pack further comprises a controller to monitor power demand within the computer system and to activate the supplemental power supply whenever the power demand exceed power generated by the fuel cell.

17. The computer system of claim 13 wherein the baseboard is a printed circuit board.

18. A method comprising:
   mounting a fuel cell within a device bay of a computer system; and
   mounting a fuel cartridge within a power pack to deliver fuel to the fuel cell;
   mounting a rotation joint on the device bay; and
   coupling a coupler to the rotation joint and the fuel cartridge to deliver fuel to the fuel cell.

19. The method of claim 18 further comprising rotating the coupler to the power pack located at the rear of a baseboard.

20. The method of claim 18 further comprising rotating the coupler to the power pack located at the front of the baseboard.

21. The method of claim 19 wherein the baseboard is a printed circuit board.

* * * * *